United States Patent Office 3,463,834
Patented Aug. 26, 1969

3,463,834
HEAT-RESISTANT, HIGH-IMPACT BLENDS OF POST CHLORINATED VINYL CHLORIDE RESINS AND A RUBBERY TETRAHYDROFURAN POLYMER
Patricia M. Dreyfuss, Akron, Ohio, assignor to The B. F. Goodrich Company, New York, N.Y., a corporation of New York
No Drawing. Filed Jan. 2, 1968, Ser. No. 694,862
Int. Cl. C08f 29/24, 45/58
U.S. Cl. 260—899                         5 Claims

ABSTRACT OF THE DISCLOSURE

There is disclosed a resinous blend of (1) for every 100 parts/wt. of apost-chlorinated vinyl chloride resin (2) from about 2 to about 20 parts/wt., more preferably from about 5 to about 15 parts/wt., of a rubbery tetrahydrofuran polymer. The rubbery tetrahydrofuran polymer should have a moderate-to-high molecular weight as evidenced by an intrinsic viscosity in benzene at 25° C. of at least about 1.5 dl./gm. in order to impart to the blend maximum resistance to impact with minimum effect on the intrinsically high heat distortion temperature of the post-chlorinated vinyl chloride resin. An antioxidant stabilizes the blend against loss of impact strength during extended mixing and service.

BACKGROUND OF THE INVENTION

Post-chlorinated vinyl chloride resins such as post-chlorinated polyvinyl chloride prepared by the low-temperature, actinically-activated post-chlorination of a porous vinyl chloride resin in an aqueous suspension containing a chloromethane swelling agent such as chloroform are excellent thermoplastics useful at service temperatures of 90° to 110° C. or more. These materials, which are to be distinguished from the older soluble types of chlorinated polyvinyl chloride used in fibers and lacquers and coating resin applications, are extremely stable, low in solubility, and have high resistance to distortion by heat. They have found a steadily growing application as pipe and tubing for household hot and cold water service and in industiral pipe and tubing for high temperature corrosive service. Post-chlorinated vinyl chloride resins, however, are brittle and difficult to process. Most of the processing aids and rubbery impact-improving additives used in vinyl resins such as polyvinyl chloride are not at all effective in improving the processing behavior or impact resistance to post-chlorinated vinyl chloride resins.

PRIOR ART

U.S. Patent No. 3,299,182 shows a commercially-important, impact-resistant blend of post-chlorinated polyvinyl chloride (hereinafter referred to by the abbreviation "PCPVC") with a rubbery, post-chlorinated polyethylene (hereinafter referred to by the abbreviation, "PCPE") additive. Such blends are extruded in the form of pipe and tubing having reliably high burst strength. The chlorinated polyethylene additive is expensive to produce and does not impart quick flow characteristics to the blend. For wider application of the post-chlorinated vinyl chloride resins, more economical and improved processing aids and impact-improving additives are required.

Until 1958, polymerized forms of tetrahydrofuran were known only as sticky, low molecular weight materials. U.S. Patent 2,856,370 disclosed the preparation of high molecular weight, rubbery poly-tetrahydrofuran. For brevity, monomeric tetrahydrofuran hereinafter will be referred to by the abbreviation "THF" and polymerized forms of tetrahydrofuran by the abbreviation "PTHF." High molecular weight PTHF shows considerable crystallinity, melts at a tempearture of about 52 to 58° C., has a density (g./ml.) at 23° C. of about 0.982 gms./ml. for the amorphous form and up to about 1.18 gms./ml. in more highly crystallized condition, and vulcanizes readily with the sulfur/peroxide curing system forming excellent rubbery vulcanizates having physical properties as follows:

Ultimate tensile strength _____p.s.i__ 4000–5500
Ultimate elongation _____percent__ 550–750
Modulus, 300% _____p.s.i__ 1200–1800

PTHF has a polyether structure (polytetramethylene glycol).

SUMMARY OF THE INVENTION

The present invention relates to thermoplastic resinous blends for high temperature service at 90° to 110° C. containing, as the base resin a post-chlorinated vinyl chloride resin and as an impact-improving processing aid, for every 100 parts/wt. of said base resin, from about 2 to about 20 parts/wt. of a moderate to high molecular weight, rubbery tetrahydrofuran polymer. Such blends have a heat distortion temperature ("HDT" in ° C. according to ASTM D–648) equivalent to or better than that of the best prior art PCPVC/PCPE blends and, in addition, a moderate to high resistance to impact as well as significantly improved processing behavior as compared to the base resin alone and to the PCPVC/PCPE blends of the prior art.

More particularly, the present invention relates to preferred blends containing only small proportions (i.e. from about 3 to about 10 parts/wt. of the PTHF material per 100 parts/wt. of base resin) and, as a third ingredient, a small amount of an antioxidant. Such preferred compositions have an excellent balance of high HDT values, high impact strength, good resistance to solvents and chemicals, good stability to heat and a very considerable resistance to degradation by high temperature mechanical shear as shown by the retention of high impact strength after long-continued, high shear mixing at high temperatures.

DETAILED DESCRIPTION

I have discovered that certain medium to moderately high molecular weight polymers of tetrahydrofuran (PTHF) are rubbery materials which, when blended with a post-chlorinated vinyl chloride resin (PCPVC), form blends having excellent resistance to heat distortion, good impact strength, and other desirable resinous properties including improved processing behavior. Only small proportions of the PTHF material are required. I have also discovered that addition of a small amount of antioxidant stabilizes the blend against loss of impact strength on extended high temperature processing.

POST-CHLORINATED VINYL CHLORIDE RESIN

PCPVC materials useful as the base resin in the blends of this invention are prepared by the post-chlorination of vinyl chloride resins produced by the polymerization of monomeric materials containing not less than about 95% by weight of vinyl chloride and not more than about 5% by weight of one or more other mono-vinylidene monomers (i.e. a monomer containing a single $CH_2=C<$ group per molecule) such as vinylidine chloride, vinyl bromide, vinyl fluoride, vinyl acetate, methyl acrylate, methyl methacrylate, acrylonitrile, ethylene, propylene, n-butene, and others. Polyvinyl chloride is much preferred.

The parent vinyl chloride resin for use in postpchlorination preferably should be a high quality material of high stability, it should be coarsely granular (i.e. made up of particles above 10 microns in diameter and up to about 200 microns in diameter), it should be more or less porous by possessing from about 5% to about 50% by volume of pore space or more, and have a moderate to high molecular weight (i.e. a inherent viscosity according to ASTM D–1243, as measured using 0.2 gram/100 ml. of cyclohexanone at 30° C. of at least 0.40, more preferably at least about 0.45 and most preferably above about 0.55, and up to about 1.45 dl./gm.)

Post-chlorination is preferably carried out by the method in U.S. Patent No. 2,996,489, namely, chlorination of the granular, porous parent resin at low temperatures in aqueous suspension in the presence of (1) actinic radiation as an activator, in the presence of (2) a hydrochloromethane compound as a swelling agent such as monochloromethane, dichloromethane and trichloromethane (chloroform), in the presence of (3) an excess of dissolved chlorine, and (4) at a temperature not higher than about 65° C. PCPVC resins made in this fashion in the presence of chloroform are generally of greater stabiilty than those made with other swelling agents.

The PCPVC material is best defined or characterized both in terms of its own physical and chemical characteristics and in terms of the parent vinyl chloride resin from which it is derived. Thus, the PCPVC materials useful in the blends of this invention should have, per se, a specific gravity at 23° C., according to ASTM D–792, of from about 1.52 to about 1.62 gms./cc. (specific gravity in these products is a direct indication of the chlorine content, the above specific gravity range corresponding to chlorine contents ranging from about 63.5% to about 69%/wt.); a heat distortion or heat deformation temperature ("HDT" in ° C. by ASTM D–648) of from about 95° to about 125° C. (a range which is at least 20° C. higher than the corresponding values for the parent vinyl chloride resins); substantially insoluble in acetone and completely soluble in hot THF; an intrinsic viscosity of at least about 0.5 and up to about 1.4 dl./gm.; a Notched Izod impact strength of at least 0.3 ft.lbs./in. of notch at 264 p.s.i. (according to ASTM D–256); and a stability to heat in the virgin or unmodified condition sufficient to survive without visible degradation on heating in air for 10 minutes at 375° C., or stated another way, at least as stable to heat as was the parent vinyl chloride resin. Such PCPVC materials are best produced by the method described above.

PREPARATION OF PTHF

Monomeric THF has the systematic name tetramethylene oxide or 1,4-epoxybutane. Thus, the polymeric PTHF may be referred as polytetramethylene oxide. PTHF has a linear structure whereas other polyepoxides have a more or less branched structure. THF polymerizes by what is believed to be a cationic mechanism using catalysts of the strong acid or Lewis acid type, including salts of these types of acids. Polymerization proceeds by opening of the furan ring forming end-to-end linear polymer chains. Many catalysts of the above general class seem capable of polymerizing THF only to liquid, low molecular weight homopolymers. When the better catalysts are employed, preferably with a co-catalyst or transfer agent, and the concentration of both of these ingredients are carefully controlled, it is possible to produce a PTHF of any desired molecular weight ranging from the liquid type up through strong, rubbery materials, and including solid, high molecular weight products exhibiting high molecular weight and considerable crystallinity. The liquid and low molecular weight PTHF materials function only as softeners or plasticizers in rigid PCPVC materials. When, however, the molecular weight of the PTHF is that evidenced by a material having a minimum intrinsic viscosity ($\eta$ as determined in benzene at 25° C.) of at least about 1.5 dl./gm., more preferably at least 2.5, the material shows in blends with PCPVC an ability to improve the impact resistance. Further increases in molecular weight of the PTHF do not seem to produce further significant improvements in impact strength. By the same token, increasing molecular weight in the PTHF seems to reduce the processability of the PTHF/PCPVC blend, although this effect is mild up to an intrinsic viscosity of about 20. Increasing PTHF molecular weight over the intrinsic viscosity range of about 2 through about 15 produces a modest increase in the tensile strength of the PTHF/PCPVC blend. For these reasons, it is preferred to employ at least partially crystalline PTHF having a molecular weight in the range equivalent to intrinsic viscosities of about 2.5 to about 15.0.

PTHF in the above ranges is a rubbery material which evidences a crystalline melting point in the range of 52° to 58° C. Once melted, about 24 hours are required for re-crystallization. PTHF/PCPVC blends, however, show a melting temperature of about 31° C. It appears that the PCPVC and/or other compounding ingredients function to very considerably reduce the somewhat elevated melting temperature of PTHF and, as a result, the PTHF/PCPVC blend is a rigid material of high tensile strength, and good impact strength at ordinary temperatures.

Catalysts for the polymerization of THF include $PF_5$; hydrocarbyl aluminum compounds (i.e. an organoaluminum compound in which at least one hydrocarbon radical is bound to aluminum by an Al-C bond) such as aluminum triethyl, diethyl aluminum chloride, ethyl aluminum dichloride, and others; cocatalyst combinations of such alkyl aluminum compounds with water or epichlorohydrin; certain complex ions such as

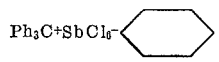

(where "Ph" is phenyl), tropylium ($+SbCl_6^-$), $$Ph_3C^+PF_6^-$$

p-chlorophenyl diazonium hexafluorophosphate $$(4\text{-}ClC_6H_4N_2^+PF_6^-)$$

and others; combinations of certain metal halides such as $FeCl_3$, $AlCl_3$, $BF_3$, etc., with promoter compounds such as epichlorohydrin, α-chlorodimethyl ether, benzyl chloride, 2,3-dichloro THF, and others; unsaturated tertiary oxonium salts $[RC(OR')_2]^+X^-$ where R is a hydrogen atom or a methyl or ethyl group, R' is a methyl or ethyl group, and $X^-$ is $PF_6^-$, $BF_4^-$ or $SbCl_6^-$; the combination of $SiF_4$ with ethylene oxide; $PF_5$ plus epichlorohydrin; $BF_3$ etherate; tertiary carboxonium salts such as are prepared by reacting an orthoester $[RC(OR)_3]$ such as trimethyl orthoformate with $BF_3$; and others.

Particularly preferred catalyst systems are based on the use of a trialkyl oxonium salt formed by reacting a Lewis Acid type of metal halide such as $HPF_6$, $PF_5$ $HSbCl_6$, $BF_3$, $SbCl_5$, $AlCl_3$, and others with an orthoester such as methyl orthoformate, ethyl orthoformate, and others. Most preferred is the $HPF_6$/orthoester combination. The preferred catalyst system affords an easy method of controlling the molecular weight of the PTHF produced. When the molar proportion of the orthoester ingredient in the reaction medium exceeds that of the metal halide, the molecular weight of the PTHF formed is inversely related to the excess of the orthoester (most efficient is trimethyl orthoformate). By this means one is able to modify the course of the reaction and produce PTHF having nearly any molecular weight ranging from liquid oligimers to hard, horny and intractable crystalline solids.

The catalysts, especially the more stable versions, and particularly those based on $HPF_6$ can be preformed and then added to the reaction medium or they may be prepared in situ by adding the separate ingredients to the reaction mixture. The latter procedure is very useful especially since THF is believed to react with the catalyst forming a THF oxonium salt which may be an active propagation species.

The polymerization to produce PTHF can be carried out in mass (i.e. no added solvent) whereby there is produced, depending on the degree of conversion and molecular weight of the PTHF produced, a more or less viscous solution ranging in viscosity up to a quite stiff, rubbery gel. Solvents or diluents preferably in small proportions may be employed such as the saturated or paraffin hydrocarbons, benzene and mixtures thereof as well as cyclo-paraffins such as cyclohexane, methylene chloride and others.

The mass-polymerized product is easily worked up by precipitating the PTHF in water or alcohol. Likewise, the PTHF can be worked up by wash-milling with water which destroys the catalyst residues and extracts residual monomeric THF. Extruder drying of the water-saturated PTHF precipitate can also be carried out since the freshly-made product has considerable tack which facilitates mechanical working.

Polymerization of THF is best carried out at temperatures in the range of from about 0° to about 85° C., with a preferred range from about 0° C. to about 50° C.

The THF monomer employed in such polymerization should be as pure as possible. Good polymerization rates are achieved with THF which has been purified by refluxing over a colloidal dispersion of sodium or potassium metals and then distilling the THF away from the dispersion with a forerun (ca. 5%/vol.) discarded until the distillate causes a sodium naphthalene complex to acquire a green color.

The polymerization is best carried out under a vacuum or under an inert atmosphere (nitrogen) purged of oxygen and moisture.

Following polymerization, the reaction product should be worked up by precipitating, coagulating or otherwise separating the solid product from residual THF monomer and/or solvents. PTHF should be dried at low temperatures of 20° to 75° C. preferably in a vacuum oven or in an extruder drier. Antioxidant and other stabilizers desirably are incorporated before precipitation.

When allowed to stand at room temperature, rubbery PTHF slowly crystallizes and becomes hard and relatively non-tacky. Such crystallinity, however, is destroyed rapidly on heating and particularly on hot mill-mixing. Crystallization of PTHF will occur in about 24 hours in a cold room maintained at 0° to 50° F. PTHF is quite stable at temperatures up to about 150° C. The rate of degradation of PTHF is temperature dependent and is greater in air or oxygen than in a vacuum. Above about 150° C., even in a vacuum, degradation is very rapid and complete degradation will occur in a matter of a few hours.

Likewise, when virgin PTHF is mixed with PCPVC materials, the blend will develop a high impact strength quite quickly but such impact strength gradually disappears if the mixing operation is continued for more than the normal 2 to 4 minutes after band formation.

It has been found, in accordance with this invention, that addition of a rubber antioxidant stabilizes the PTHF and, in the blends, makes for much more tenacious retention of impact strength. Such use of antioxidant makes it necessary to mix the blend for a somewhat longer time and at a somewhat higher temperature in order to reach equivalent impact properties.

Any antioxidant material can be employed for this purpose. However, the hindered-phenol type such as 2,6-di-t-butyl-4-methyl-phenol, t-butyl catechol, and others have been found particularly efficient. Only a very small amount of antioxidant appears to be required since amounts of 0.2 to 0.50 parts/wt. per 100 parts by weight of total polymer (PCPVC + PTHF) appear to be fully effective. Up to 1.0 to 1.5 parts/wt. per 100 parts by weight of polymer can be employed. However, in rigid materials such as the preferred blends of this invention it is usually desirable to add as little as possible of any and all additives due to the fact that most additives have a tendency to reduce the physical properties of the blend.

BLEND COMPOSITION

The blends of this invention comprise, as polymeric constituents, for every 100 parts by weight of the PCPVC ingredient from about 2 to about 20 parts/wt. of the PTHF. This widest range encompasses materials which range (at the low PTHF levels) from materials which are hard, stiff, and combine good resistance to distortion by heat with high tensile strength to (at the high end of the range) materials which are hard and resistant to impact, and are fast-processing.

Since the higher proportions of PTHF reduce the resistance of the blend to distortion by heat and also somewhat reduces the resistance of the blend to chemicals, solvents, and water, the preferred blends of this invention contain as polymeric constituents from about 4 to about 15 parts/wt. of PTHF for every 100 parts/wt. of the PCPVC ingredient. Best rigid properties are possessed by blends which contain as polymeric constituents from about 5 to about 10 parts/wt. of PTHF for every 100 parts/wt. of the PCPVC ingredient.

PREPARATION OF BLENDS

The PCPVC base resin and the PTHF ingredients can be combined by any method which insures efficient dispersion of the latter in the former. Mill or Banbury mixing at temperatures ranging from about 335° to about 435° F. are quite effective and result in smooth flowing compositions of excellent properties. PTHF has the advantage of melting at such processing temperatures and functioning as a high temperature processing aid. Preferred mixing temperatures are from about 375° F. to about 420° F. The temperatures referred to herein are the temperatures of the metal surfaces of the mixing equipment in contact with the plastic material. Stock temperatures will be somewhat higher due to frictional heat buildup. The best procedure is to combine all ingredients except the PTHF on the mill or in the Banbury mixer, mix to fusion or band formation, add the PTHF and mix again to band formation and then continue mixing for from 2 to about 5 minutes additional.

OTHER INGREDIENTS

The blends of this invention may contain other compounding ingredients such as fillers, pigments, colorants, opacifiers, lubricants, stabilizers, ultra-violet absorbers, and the like. Titanium dioxide (rutile) is a particularly effective filler material which contributes slightly better impact strength, opacity, and a good white color. Fillers, pigments and other dry and powdery ingredients should usually be held below about 10%/wt. based on the polymeric ingredients of blend. As lubricants, calcium stearate, paraffin mineral oil, low molecular weight polyethylene and others are effective in amounts of from about 0.5 to about 2.5%/wt. based on the weight of polymeric constituents. Tin, lead barium/cadmium, iron oxide and other stabilizers for the PCPVC constituent are preferably employed in amounts of from about 0.5% to 3%/wt. based on the PCPVC content of the mix.

The invention will now be described with reference to several specific examples which are intended as illustrative only and not as a limitation on the invention.

Example I

Monomeric THF is refluxed for about 48 hours at atmospheric pressure in a condenser-equipped flask containing a sodium metal dispersion in mineral oil. Heat is then applied and the condensate is diverted to another container. The condensate is tested from time to time with sodium naphthalene complex and when the latter develops a green color, the stream of condensate is directed into dry, nitrogen-flushed glass bottle receiver while maintaining a nitrogen flow therein. When nearly full, the bottle is capped.

Into each such bottle containing 440 to 470 grams of THF, there is added about 0.2 gram of "phosfluorogen A,"

or p-chlorophenyldiazonium hexafluoro - phosphate, together with an amount of trimethylorthoformate indicated in the table below. The containers are opened under a nitrogen blanket in order to charge the catalyst ingredients after which they are immediately sealed again. The containers thus prepared are tumbled end-over-end in a 25° C. water bath for 24 hours or less. The reaction proceeds with a gradual change to a dark brown color and a gradual thickening of the reaction mixture.

After reaction has proceeded to the point of a thick gel, the container is broken and the contents placed in 3 liters of a 5%/wt. solution of acetic acid in THF. The rubbery gel-like material dissolves forming a solution of viscous "cement" like character. The latter is poured into a large quantity of agitated water whereby the THF dissolves in the water and the solid polymer content precipitates as a rubbery, slightly stocky crumb. The crumbs are allowed to stand in water for some hours after which the crumbs are filtered off. The thus-obtained solid crumbs are wash milled into loose sheets and 0.5 part/wt. per 100 parts/wt. PTHF of 2,6-di-t-butyl-4-methylphenol are incorporated during such milling. The resulting sheets are then dried at 50° C. in a vacuum oven.

The data tabulated below demonstrate how simple it is to vary the molecular weight of PTHF solely by varying the proportion of trimethylorthoformate. Intrinsic viscosity, determined at 25° C. in benzene is employed as a direct measure of molecular weight.

| Sample No. | THF, grams | Wt. (gms.) phosfluorogen A | Wt. (gms.) trimethyl-orthoformate, (ml.) | Yield, percent/wt. | Intrinsic viscosity dl./gm |
|---|---|---|---|---|---|
| 130 | 450 | 0.2016 | 1.25 | 75.3 | 1.1 |
| 75 | 462 | 0.2190 | 0.60 | 74.4 | 1.8 |
| 74 | 460 | 0.2185 | 0.25 | 76.3 | 3.5 |
| 1,674 | 470 | 0.2128 | 0.25 | 74.5 | 3.8 |
| 1,682 | 453 | 0.2039 | ¹1.5 | 74.5 | 7.6 |
| 1,672 | 438 | 0.2047 | 0 | 74.0 | 16 |

¹ Dilute Soln. 0.5 ml. trimethylorthoformate and 9.5 ml. THF.

On standing at room temperature all of the PTHF samples prepared by the above procedure became hard, stiff, and opaque due to crystallization. When reheated in air at 140° F. for some time, the samples became clear, soft and rubbery in character.

Example II

The above and other PTHF materials made in a similar fashion are utilized in blends with a commercially-produced after-chlorinated polyvinyl chloride having a density of 1.56 gms./ml. (according to ASTM D-792 at 23° C.), such a density corresponding to a chlorine content of 66%/wt. and an intrinsic viscosity of 0.87. Such a PCPVC is resin prepared by a method similar to that of U.S. Patent 2,996,489 involving the post-chlorination of an easy-processing porous grade of polyvinyl chloride having an inherent viscosity of about 0.94 (determined in same manner). The blends are prepared by milling a PCPVC masterbatch until a smooth sheet adheres to the back roll, then adding the PTHF and continuing the milling until a smooth sheet again forms after which milling is continued for four minutes cutting the batch back and forth to insure homogeneity. The mill employed is a two-roll differential plastics mill having 4-inch rolls oil-heated to about 385° F.

The PCPVC masterbatch is prepared by mixing the ingredients listed below at 2600 r.p.m. in a Henschel mixer with a final stack temperature of 149-150° F.

Masterbatch: Parts/wt.
PCPVC described _____ 100
Stabilizer ¹ _____ 2.5
TiO₂ (rutile) _____ 5.0
Polyethylene lubricant ² _____ 1.0

¹ Dibutyl tin thioglycollate.
² "Ac629A," low molecular weight polyethylene made by Allied Chemical Corporation.

About 108.5 grams of the above masterbatch are blended by the procedure described with the quantity of PTHF listed below. The resulting milled batches are compression molded at 400° F. in a standard ASTM tensile sheet mold under 40,000 lbs. force employing a cycle of four minute preheat, molding for three minutes under pressure, and cooling to room temperature under full pressure. The resulting press molded sheets are tested for tensile strength (ASTM D-638-61T employing a stretching rate of 2 in./min. at 77° F.); Izod impact strength (according to ASTM D-256-56, method A, at 264 p.s.i. applied pressure); water absorption (ASTM D-570-63) and other immersion tests according to ASTM D-471; and evaluated for relative processing ease (melt flow rate) by a proprietary test employing a constant load rheometer in which a four gram sample of the blend is confined in a chamber at 200° C. under a piston exerting 400 lbs. force and measuring the amount of compound extruded out of the chamber in a given time through an orifice of 0.0459 inch and an orifice length of 0.3260 inch.

TABLE I.—EFFECT OF PTHF MOLECULAR WEIGHT

| [η]¹ | PHR² PTHF | 11.2 melt flow rate³ | 5,900 tensile strength, p.s.i. | 3.0 izod, ft.lbs./ inch |
|---|---|---|---|---|
| 1.1 | | | | |
| 1.8 | 8.75 | +8 | 6,300 | 6.9 |
| 3.1 | Same | 7.2 | 6,000 | 6.3 |
| 3.5 | Same | 7.6 | 6,400 | 7.5 |
| 7.5 | Same | 6.5 | 6,000 | 7.4 |
| 16.0⁴ | Same | 6.8 | 6,500 | 7.3 |
| Control⁵ | | 3.6 | 7,100 | 2.5 |

¹ Intrinsic viscosity of PTHF.
² Parts/wt. per 100 parts/wt. of PCPVC.
³ Grams/10 minutes.
⁴ Milled 4 min. at 400° F.
⁵ 100 parts/wt. PCPV plus 8.75 parts/wt. of PCPV; composition otherwise same as master batch.

Over the range of intrinsic viscosity from 1.8 through 16, PTHF is able to impart somewhat higher impact strength than an equal quantity of the prior art PCPE additive in the control composition. Also, the lower molecule weight PTHF materials imparted slightly higher flow rates. Note that the blend containing PTHF having an I.V. of 1.1 is deficient in both tensile strength and Izod impact values. While the tensile strength of the PTHF/PCPVC blends is slightly lower than the control, it is well above the minimum of about 5000 p.s.i. which normally is expected in a rigid resin.

Example III

A number of samples of a blend similar to those above were aged at room temperature in air and testing one sample for Izod impact strength at intervals of every day or so. The blend employed contained 8.75 phr. of a PTHF made by the procedure described having an [η] of 3.46. The data are:

Time-days: Izod impact ft. lbs./in.
1 _____ 5.92
2 _____ 5.08
3 _____ 5.60
6 _____ 6.53
8 _____ 5.64
20 _____ 6.02

The above data indicate that the blend was stable since the variation in the Izod values is close to experimental error.

Example IV

In this example, the effect of the concentration of PTHF on impact strength and dynamic extrusion properties is evaluated. The PCPVC is the same as in Example I, the PTHF employed is made by the procedure described and exhibits a $[\eta]$ of 1.8. The data are:

| Conc. PTHF PHR | Izod, ft. lbs./in. | Melt flow, gms/10 min. | T1,[1] ° C. | T2,[1] ° C. |
|---|---|---|---|---|
| 0 | Ca. 0.5 | Ca. 0.4 | 132 | 178 |
| 1 | 0.5 | 0.5 | 131 | 173 |
| 2 | 1.0 | 1.0 | 124 | 173 |
| 5 | 2.4 | 3.7 | 126 | 170 |
| 6 | 6.2 | 3.7 | 120 | 169 |
| 8 | 7.5 | 4.2 | 119 | 168 |
| 10 | 6.8 | 7.8 | 114 | 164 |
| Control [2] | 4.8 | 3.4 | 117 | 166 |

[1] Proprietary constant load rheometer test, T1 approximating 2nd order transition temp. and HDT and T2 approximating flow point.
[2] Containing 8.75 PHR CPE modifier but otherwise similarly compounded.

These data indicate that PTHF of this molecular weight range is roughly equivalent on a concentration basis to the prior art PCPE additive in its efficiency at improving impact strength and that it contributes somewhat better processing behavior as well as being somewhat better in having lesser effects on the heat distortion characteristics (as shown by T1/T2 values).

Example V

In this example, a PTHF made by the method described and having an $[\eta]$ of 3.32 (benzene, 25° C.) is utilized at a level of 5.0 and 8.75 phr. in the same PCPVC material shown in Example I. For purposes of comparison, a similar blend of PCPVC containing 8.75 phr. of post-chlorinated polyethylene modifier (PCPE) of the prior art is provided as a control. All three series of blends are subjected to a more thorough physical testing. The data are as follows:

| Property | Additive 8.75 PHR PTHF | Additive 5.0 PHR PTHF | (Control) 8.75 PHR PCPE |
|---|---|---|---|
| Notched izod, RT ft. lbs./in. | 7.47 | 6.98 | 6.53 |
| Notched izod, 0° C., ft. lbs./in. | 3.98 | 2.89 | 1.85 |
| Heat distortion temp. ° C. | 107 | 106 | 104.5 |
| Tensile strength, p.s.i. | 6,270 | 7,540 | 7,680 |
| T1 | 119 | 123 | 117 |
| T2 | 166 | 169 | 165 |

These data again confirm the high efficiency of PTHF as a combined impact-improver and processing aid. This series of experimental blends indicate the relatively greater efficiency of an intermediate molecular weight in the PTHF (compare similar data with PTHF having I.V. of 1.1 and 1.8).

Example VI

In this example, still another PTHF/PCPVC blend (5 phr. PTHF) is evaluated against the prior art compound of Example V, in this case the resistance of the blends to water, methanol, xylene and concentrated acid is determined. The PTHF employed in the blend of this example exhibited a $[\eta]$ of 3.46 (benzene, 25° C.) and the PTHF/PCPVC blends are prepared according to the procedure given above. The data are as follows:

| Chemical | Test temp., ° C. | Time | Percent wt. increase PCPE | Percent wt. increase PTHF |
|---|---|---|---|---|
| Water | 100 | 72 hrs. | 0.67 | 0.89 |
| | R.T. | 30 (days) | 0.19 | 0.25 |
| Methanol | R.T. | 12 (days) | 1-2 | 1-5 |
| Xylene | R.T. | 12 (days) | 82-112 | 87-100 |
| Conc. H₂SO₄ | R.T. | 28 (days) | −0.050 | −0.049 |

These data indicate that the PCPVC/PTHF blends are very close in chemical and solvent resistance to the prior art PCPVC/PCPE blends. Since PTHF will impart impact values and flow properties at the 5–6 part/wt. level (see Example V) which are equivalent to or better than those obtained with PCPE at the 8.75 part/wt. level, it is believed slightly lower PTHF levels could produce blends very nearly equivalent in chemical and solvent resistance to those of the PCPE control blend above.

Example VII

The effect of 2,6-di-t-butyl-4-methylphenol antioxidant present in the PTHF, employed in the blends of the foregoing examples is demonstrated in this example. The stabilizing influence of this additive is evaluated by measuring both the Izod impact and the melt flow of samples of blends both with and without the antioxidant and milled for varying time at 385° F. The PTHF and its concentration (5 phr.) is the same as employed in the blends of the preceding example. The prior art blend employed as a control contains 8.75 phr. of the PCPE additive. The data are:

| Additive-PHR | Time of milling at 385° F. (minutes) | Izod impact, ft. lbs./in. | Melt flow, g./10 min. |
|---|---|---|---|
| PTHF-5+A.O. | 4 | 5.3 | 6.0 |
| | 8 | 7.0 | 5.7 |
| | 15 | 5.0 | 6.6 |
| | 20 | 3.0 | 6.0 |
| PTHF-5 (no A.O) | 4 | 6.6 | 3.8 |
| | 8 | 4.5 | 4.1 |
| | 15 | 2.5 | 4.2 |
| | 20 | 2.1 | 4.6 |
| PCPE-8.75 (control) | 4 | 6.0 | 4.2 |
| | 8 | 4.9 | 4.0 |
| | 15 | 3.2 | 3.5 |
| | 20 | 3.9 | 3.0 |

These data show that the blends containing PTHF to which the 0.5% wt., of antioxidant had been added retains its high impact strength more tenaciously than both the similar PTHF/PCPVC blend not containing the antioxidant and also better than the prior art PCPE/PCPVC blend. The PTHF blend with antioxidant had twice the melt flow value at 20 minutes milling time than did the prior art blend. The PTHF blends have wider processing latitude since the time of milling has but minor effect on the impact strength and melt flow behavior. Such blends appear to be very stable to high shear, high temperature mixing.

Similar tests involving the use of milling temperatures of 370° F. and 410° F. show that the PTHF blends are somewhat better processing at 385° and 410° F. than at 370° F. since higher impact strength is reached in shorter mixing cycles and such impact strength is more tenaciously retained over longer milling cycles. Similarly, uniformly higher melt flow values are maintained by the antioxidant-containing blends even after milling for as much as 20 minutes at 410° F.

I claim:
1. An impact resinous composition comprising
   (1) for every 100 parts/wt. of a post-chlorinated vinyl chloride homopolymer or copolymer containing not less than about 95% by weight vinyl chloride having (a) a density between about 1.52 and about 1.62 grams/ml. at 23° C. according to test method ASTM D–792, and (b) a stability sufficient to survive heating in air for 10 minutes at 375° C.; and
   (2) as an impact-improver, from about 2 to about 20 parts/wt. of a rubbery, polymerized tetrahydrofuran having an intrinsic viscosity in benzene at 25° C. of at least 1.5 dl. gm.
2. A composition as claimed in claim 1, and further characterized by said post-chlorinated vinyl chloride polymer being a post-chlorinated polyvinyl chloride and by said impact-improver being present in a proportion in the range of from about 5 to about 15 parts/wt.
3. A composition as defined in claim 1 and further characterized by said post-chlorinated vinyl chloride polymer being a post-chlorinated polyvinyl chloride, by said impact-improver being a rubbery polymerized tetrahydrofuran having an intrinsic viscosity of from about 2.5 to 10.0 and is present in from about 5 to about 10 parts/wt.

for every 100 parts/wt. of said base resin and by said composition containing from about 0.2% to about 3% wt. of an antioxidant based on the weight of (1) and (2).

4. A composition as defined in claim 1 and further characterized by a fully-fused condition in which the polymerized tetrahydrofuran is uniformly distributed through the composition, and the composition exhibits high resistance to impact.

5. An impact-resistant resinous composition comprising, as polymeric ingredients,
   (1) for every 100 parts/wt. of a post-chlorinated polyvinyl chloride having a density of from about 1.52 to about 1.62 gm./ml. according to test method ASTM D-792 at 23° C.; and
   (2) from about 5 to about 10 parts/wt. of a rubbery polymerized tetrahydrofuran having an intrinsic viscosity in benzene at 25° C. between about 2.5 and about 10, and said composition is in a fully-fused and fluxed condition by reason of having been mixed under shear at temperatures of about 375° to about 425° F.

References Cited
FOREIGN PATENTS
928,799   6/1963   Great Britain.

MURRAY TILLMAN, Primary Examiner

C. J. SECCURO, Assistant Examiner

U.S. Cl. X.R.

260—41, 45.75, 45.95

PO-1050
(5/69)

UNITED STATES PATENT OFFICE
CERTIFICATE OF CORRECTION

Patent No. 3463834      Dated August 26, 1969

Inventor(s) Patricia M. Dreyfuss

It is certified that error appears in the above-identified patent and that said Letters Patent are hereby corrected as shown below:

Column 1, line 45 "industrial" is misspelled' column 3, line 1 "postpchlorina-" should be --postchlorina- --; column 7, line 75 "stack" should be --stock--; column 8, line 44, "PCPV second instance, should be --PCPE--; column 9, in the chart line 13 "6" should be --4--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3463834      Dated August 26, 1969

Inventor(s) Patricia M. Dreyfuss

It is certified that error appears in the above-identified patent and that said Letters Patent are hereby corrected as shown below:

Column 1, line 45 "industrial" is misspelled' column 3, line 1 "postpchlorina-" should be --postchlorina- --; column 7, line 75 "stack" should be --stock--; column 8, line 44, "PCP second instance, should be --PCPE--; column 9, in the chart line 13 "6" should be --4--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents